United States Patent
Wakao et al.

(10) Patent No.: US 11,607,900 B2
(45) Date of Patent: Mar. 21, 2023

(54) INK JET RECORDING METHOD AND INK JET RECORDING APPARATUS

(71) Applicant: CANON KABUSHIKI KAISHA, Tokyo (JP)

(72) Inventors: Saki Wakao, Kawasaki (JP); Yuhei Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 16/916,236

(22) Filed: Jun. 30, 2020

(65) Prior Publication Data
US 2021/0001656 A1 Jan. 7, 2021

(30) Foreign Application Priority Data

Jul. 1, 2019 (JP) .............................. JP2019-122713
Jun. 24, 2020 (JP) .............................. JP2020-108790

(51) Int. Cl.
*B41M 5/00* (2006.01)
*C09D 11/54* (2014.01)
(Continued)

(52) U.S. Cl.
CPC .............. *B41M 5/0023* (2013.01); *B41J 2/01* (2013.01); *B41J 2/2107* (2013.01); *B41J 2/2114* (2013.01); *C09D 11/40* (2013.01); *C09D 11/54* (2013.01)

(58) Field of Classification Search
CPC ...... C08F 220/1807; C08F 2/48; C08F 20/28; C08F 220/1808; C08F 220/1811; C08F 220/1812; C08F 220/301; C08F 220/302; C08F 220/282; B41J 2/16552; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175;
(Continued)

(56) References Cited

U.S. PATENT DOCUMENTS 5,681,381 A * 10/1997 Auslander .............. C09D 11/30
347/100
8,425,027 B2 4/2013 Nishiwaki et al.
(Continued)

FOREIGN PATENT DOCUMENTS

JP 2003-073599 A 3/2003
JP 2005-120348 A 5/2005

*Primary Examiner* — Manish S Shah
(74) *Attorney, Agent, or Firm* — Venable LLP

(57) ABSTRACT

The method is an ink jet recording method, which uses an ink set being composed of a plurality of aqueous inks and including a combination of a first ink containing a coloring material and a second ink containing no coloring material and by which an image is recorded by applying the first ink and the second ink onto a recording medium so that an area to which the first ink is applied and an area to which the second ink is applied overlap at least in part with each other. The coloring material of the first ink contains fluorescent dye, the second ink contains a first water-soluble organic solvent, and an SP value $S_S$ of the first water-soluble organic solvent and an SP value $S_D$ of the fluorescent dye satisfy a relationship of the following formula (1):

$$|S_S - S_D| \leq 4.0 \quad (1).$$

23 Claims, 1 Drawing Sheet

(51) Int. Cl.
*B41J 2/21* (2006.01)
*C09D 11/40* (2014.01)
*B41J 2/01* (2006.01)

(58) Field of Classification Search
CPC .... B41J 2/17563; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; C08K 5/5397; C09D 11/101; C09D 11/36; C09D 11/40; C09D 11/30; C09D 11/38; C09D 11/32; C09D 11/322; C09D 11/324; C09D 11/328; C09D 11/102; C09D 11/005; C09D 11/54; C09D 11/52; C09D 11/106; C11D 3/361; C11D 3/3757; C11D 3/3765; C11D 11/0023; C11D 11/0047; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 2005/0061199 A1 | 3/2005 | Tsuda et al. |
| 2014/0092168 A1* | 4/2014 | Ito .................. B41J 2/16552 |
| | | 106/31.86 |
| 2019/0100669 A1* | 4/2019 | Murai ................ B41M 5/0023 |

* cited by examiner

INK JET RECORDING METHOD AND INK JET RECORDING APPARATUS

This application claims the benefit of Japanese Patent Application No. 2019-122713, filed Jul. 1, 2019, and Japanese Patent Application No. 2020-108790, filed Jun. 24, 2020, which are hereby incorporated by reference herein in their entirety.

BACKGROUND OF THE INVENTION

Field of the Invention

The present invention relates to an ink jet recording method and an ink jet recording apparatus used for the ink jet recording method.

Description of the Related Art

An ink using a coloring material that exhibits fluorescence (hereinafter, also referred to as "fluorescent ink") vividly develops the color, and therefore, has become to be used for printing of notices such as poster and POP advertisement, packages of foods and beverages, or the like. In such an application, it is important to record an image with higher fluorescence intensity in order to attract more attention. In order to record an image with high fluorescence intensity, for example, a fluorescent ink containing fluorescent dye and polyols (Japanese Patent Application Laid-Open No. 2005-120348), and a fluorescent ink using a resin particle that contain a fluorescent coloring material (Japanese Patent Application Laid-Open No. 2003-073599) have been proposed.

The present inventors have investigated the fluorescence intensity of an image recorded with a fluorescent ink containing fluorescent dye and polyols, which has been proposed in Japanese Patent Application Laid-Open No. 2005-120348. As a result, it has been found that the fluorescence intensity of the recorded image is increased as compared with the case where a fluorescent dye ink that contains no polyols is used, but the level is still insufficient.

The present inventors have further investigated the fluorescence intensity of an image recorded with a fluorescent ink using a resin particle that contain a fluorescent coloring material, which has been proposed in Japanese Patent Application Laid-Open No. 2003-073599. As a result, it has been found that the resin particle that contains a fluorescent coloring material are less likely to permeate a recording medium and tend to remain on the surface, as compared with a case of a mere fluorescent dye. Accordingly, it has been found that the fluorescence intensity of an image recorded with a fluorescent ink using the resin particle that contains a fluorescent coloring material is improved, but the level is still insufficient.

Therefore, an object of the present invention is to provide an ink jet recording method by which an image being excellent in the fluorescence intensity can be recorded with the use of a fluorescent ink. Further, another object of the present invention is to provide an ink jet recording apparatus used for the ink jet recording method.

SUMMARY OF THE INVENTION

That is, according to the present invention, an ink jet recording method, including: using an ink set being composed of a plurality of aqueous inks and including a combination of a first ink containing a coloring material and a second ink containing no coloring material; and recording an image by applying the first ink and the second ink onto a recording medium so that an area to which the first ink is applied and an area to which the second ink is applied overlap at least in part with each other, the coloring material of the first ink containing a fluorescent dye, the second ink containing a first water-soluble organic solvent, and a solubility parameter (SP) value $S_S$ of the first water-soluble organic solvent and an SP value $S_D$ of the fluorescent dye satisfying a relationship of the following formula (1):

$$|S_S - S_D| \leq 4.0 \tag{1}$$

According to the present invention, an ink jet recording method, by which an image being excellent in the fluorescence intensity can be recorded with the use of a fluorescent ink, can be provided. Further, according to the present invention, an ink jet recording apparatus used for the ink jet recording method can be provided.

Further features of the present invention will become apparent from the following description of exemplary embodiments with reference to the attached drawings.

DESCRIPTION OF THE EMBODIMENTS

Figure 1A:
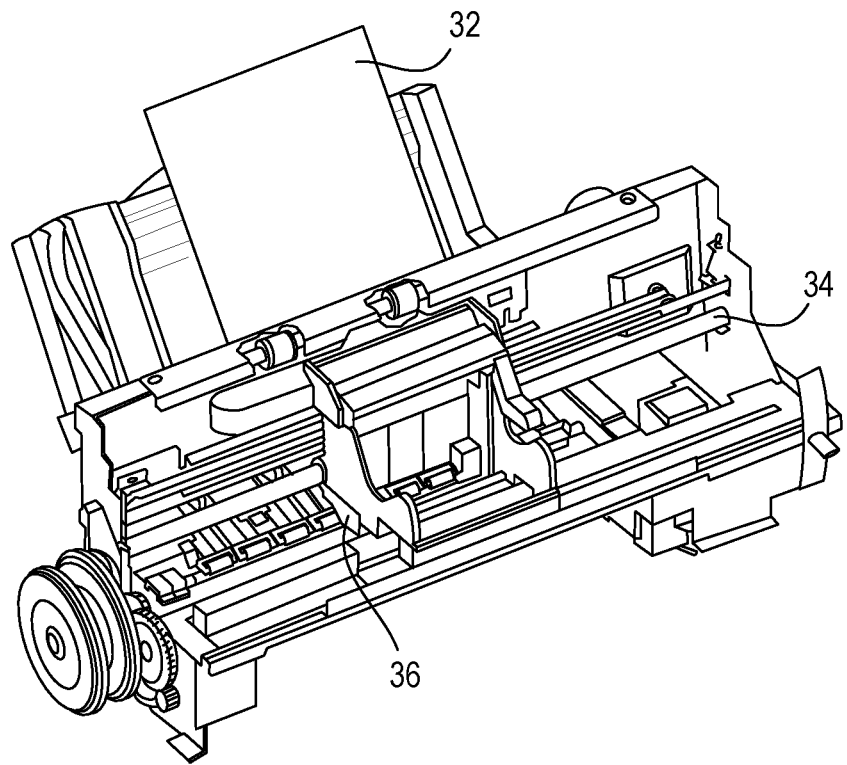
FIG. 1A is a perspective view illustrating an essential part of an ink jet recording apparatus used for the ink jet recording method of the present invention.

The present invention will further be detailed, referring to preferred embodiments. In the present invention, any compound in the form of salt, although dissociates to produce ions in the ink, will be referred to as "contains a salt" for convenience sake. The aqueous ink for ink jet may be occasionally and simply referred to as "ink". Physical data are those observed at normal temperature (25° C.) unless otherwise specifically noted. In the present invention, the "unit" that constitutes the resin means a repeating unit derived from a single monomer. Further, the ink of the present invention is an aqueous ink, and therefore, the unit of "molar concentration" in the present specification is calculated with the specific gravity of ink as "1 g/mL".

First, a clear ink used for improving the fluorescence intensity of an image recorded with an ink containing a fluorescent dye will be described. One of the factors that cause a decrease in the fluorescence intensity of an image is concentration quenching. The concentration quenching refers to a phenomenon in which the fluorescence intensity of an image to be recorded is rather decreased when the concentration of a fluorescent coloring material is increased to a certain level or higher. In general, the excitation energy absorbed into a fluorescent coloring material is transferred in the fluorescent coloring material and consumed by the intermolecular interaction of the fluorescent coloring material, and thus the concentration quenching occurs. For this reason, as the intermolecular distance of the fluorescent coloring material is larger, the concentration quenching is less likely to occur. However, if a fluorescent ink containing a fluorescent dye is applied onto a recording medium, the fluorescent dye associates and aggregates in the recording medium as the liquid components permeate the recording medium. It is considered that since the intermolecular distance of the fluorescent dye is reduced due to the aggregation of the fluorescent dye, the concentration quenching is likely to occur and the fluorescence intensity of the image is decreased.

The present inventors have assumed that in order to increase the fluorescence intensity of the image, it is important to reduce the association or aggregation of the fluorescent dye and to increase the intermolecular distance of the fluorescent dye, and the investigation has been conducted focusing on the relationship between the water-soluble organic solvent and the fluorescent dye in a clear ink to be used in combination with an ink containing the fluorescent dye. As a result, it has been found that the SP value $S_S$ of the water-soluble organic solvent in a clear ink (second ink) containing no coloring material and the SP value $S_D$ of the fluorescent dye in a fluorescent ink (first ink) are required to satisfy a relationship of the following formula (1):

$$|S_S-S_D| \leq 4.0 \quad (1).$$

If the relationship of the above formula (1) is satisfied, the fluorescence intensity can be increased regardless of the order of applying respective inks onto the recording medium. Hereinafter, for the sake of simplicity, the explanation will be made with reference to a case where a fluorescent ink (first ink) is applied onto a recording medium and then a clear ink (second ink) is applied will be described as an example. If the above second ink is applied over the first ink, the water-soluble organic solvent (first water-soluble organic solvent) having a high affinity for fluorescent dye also comes into contact with the associate or aggregate of the fluorescent dye when the second ink comes into contact with the associated or aggregated fluorescent dye. The first water-soluble organic solvent solvates a part of the fluorescent dye, so that the associate or aggregate is loosened, the fluorescent dye is more likely to be diffused in the recording medium, and the fixing range of the fluorescent dye is expanded. In this way, it is considered that the intermolecular distance of the fluorescent dye is expanded and the fluorescence intensity of the image is increased. In a case where the second ink is applied and then the first ink is applied, it is also considered that the first water-soluble organic solvent applied onto the recording medium beforehand suppresses the association and aggregation of the fluorescent dye, so that the fixing range of the fluorescent dye in the recording medium is expanded, and the fluorescence intensity of the image is increased.

As a result of further investigation, it has been found that when a first ink containing a first resin particle that is dyed with fluorescent dye is used and further the SP value $S_R$ of a resin forming the first resin particle and the SP value $S_S$ of the first water-soluble organic solvent satisfy a relationship of the following formula (2):

$$|S_S-S_R| \leq 3.5 \quad (2),$$

the fluorescence intensity of the image is further improved.

In the image recorded with the first ink containing the first resin particle, the concentration quenching occurs not only among a plurality of the first resin particle but also inside the first resin particle. This is considered that if the second ink containing the first water-soluble organic solvent that satisfies the relationship of the above formula (2) is applied over the first ink, the following phenomenon occurs. On a layer formed of the first resin particle, when the concentration of the first water-soluble organic solvent is increased due to the evaporation of water of the second ink, the first water-soluble organic solvent having a high affinity permeates the inside of the first resin particle. As a result, a so-called swelling phenomenon occurs in which the intermolecular distance of the resin constituting the first resin particle is extended. Since the fluorescent dye colors the resin constituting the resin particle, the swelling of the first resin particle facilitates the entering of the first water-soluble organic solvent also between the molecules of the fluorescent dye. In this way, it is considered that the association of the fluorescent dyes is reduced, and the fluorescence intensity of the image is further improved. In a case where the second ink is applied and then the first ink is applied, it is also considered that the first water-soluble organic solvent applied onto a recording medium beforehand reduces the aggregation of the first resin particle, and further migrates to the inside of first resin particle, and reduces the association of the fluorescent dye, and therefore, the fluorescence intensity of the image is further improved. In any case, if the second ink containing no first water-soluble organic solvent that satisfies the relationship of the above formula (2) is used, the first resin particle do not swell sufficiently, and therefore, it would be difficult to sufficiently reduce the association of the fluorescent dye.

In particular, in order to further improve the fluorescence intensity of an image, it is preferred that the SP value $S_R$ of a resin forming the first resin particle and the SP value $S_S$ of the first water-soluble organic solvent satisfy a relationship of the following formula (3):

$$|S_S-S_R| \leq 2.0 \quad (3).$$

<Ink Jet Recording Method and Ink Jet Recording Apparatus>

The ink jet recording method of the present invention is a method by which an image is recorded on a recording medium with the use of an ink set being composed of a plurality of aqueous inks and including a combination of a first ink containing a coloring material and a second ink containing no coloring material. Further, an image is recorded by applying the first ink and the second ink onto a recording medium so that an area to which the first ink is applied and an area to which the second ink is applied overlap at least in part with each other. In addition, the ink jet recording apparatus of the present invention is used for the ink jet recording method described above. The ink jet recording method and ink jet recording apparatus of the present invention will be described in detail below. The present invention is by no means limited by the description below, without departing from the spirit thereof.

The "area to which the second ink is applied" includes an area to which the first ink has already been applied, and an area to which the first ink has not yet been applied but the first ink is applied after the application of the second ink. Further, the expression "so that . . . overlap at least in part with each other" means that the area to which the first ink is applied and the area to which the second ink is applied overlap partially or entirely.

The ink jet recording method of the present invention preferably includes a first recording step of applying a first ink onto a recording medium, and a second recording step of applying a second ink onto the recording medium so that an area to which the second ink is applied overlaps at least in part with an area to which the first ink is applied. Among them, it is preferred that an image is recorded by applying the second ink on an image recorded with the first ink.

The "unit area" in the present specification means a unit area of a recording medium to which the second ink and the first ink are applied. Although it is necessary to align and compare the unit areas of the respective inks with each other, any area such as 1 square inch or 1 pixel can be set as the unit area. The amount of each of the first ink and the second ink, which are applied to a unit area, may be determined according to an image to be recorded, and is not limited to this, and it is preferred that the amount of the second ink to be applied is 0.1 times or more to 10.0 times or less when expressed in mass ratio relative to the amount of the first ink to be applied.

As the recording medium, any recording medium can be used. Among them, as the recording medium, it is preferred to use a paper-based recording medium having permeability, for example, a recording medium having no coat layer such as plain paper, a recording medium having a coat layer such as glossy paper, matte paper or art paper, or the like. In particular, it is preferred to use a recording medium having a coat layer, which at least a part of the coloring material in an ink can be allowed to exist on and in the vicinity of the surface thereof. The recording medium can be selected according to the intended use or the like of the recorded articles to be obtained by recording an image. For example, glossy paper that is suitable for recording an image having a glossiness of photographic image quality, art paper that makes use of the texture of the base material (drawing paper texture, canvas texture, Japanese paper texture, etc.) in order to express a painting, a photograph, a graphic image or the like according to the preference, or the like can be selected and used. Among them, it is particularly preferred to use so-called glossy paper, which has glossiness on a surface of the coat layer.

(Ink Set)

An ink set of the present invention is composed of a plurality of aqueous inks, and includes a combination of a first ink containing a coloring material and a second ink containing no coloring material. The first ink and the second ink are not required to react or thicken when these inks come into contact with each other. That is, it is not required to contain a reactant or a thickener in each of the inks. The ingredients contained in each ink and the physical properties of the ink will be described in detail below.

The SP value ($\delta$) [unit: (cal/cm$^3$)$^{1/2}$] in the present specification is a value calculated by the Fedors method on the basis of the following formula (A). The $\Delta E_{vap}$ and V of a compound can be determined by referring to, for example, the description of Coating Newsletter No. 193 (1992) and the like.

$$\delta = \sqrt{\frac{\Delta E_{vap}}{V}} \tag{A}$$

(In the above formula (A), $\Delta E_{vap}$ represents molar heat of vaporization (cal/mol) of a compound, and V represents molar volume (cc/mol) of a compound at 25° C.)

(1) First Ink

[Fluorescent Dye]

The first ink includes a coloring material containing fluorescent dye. Further, the SP value $S_S$ of a first water-soluble organic solvent in the second ink to be described later and the SP value $S_D$ of a fluorescent dye in the first ink satisfy a relationship of the following formula (1):

$$|S_S - S_D| \leq 4.0 \tag{1}$$

The "fluorescent dye" in this patent specification means a dye that emits fluorescence with the aid of excitation light in the ultraviolet or visible region. Whether a certain dye is a "fluorescent dye" that emits fluorescence or not may be determined, for example, by the method below. A dye is dissolved in a liquid capable of solubilizing the dye, and the obtained sample is irradiated with ultraviolet radiation (UV light) in a long wavelength range (approximately 315 to 400 nm) which is slightly visible, using a black light or the like. If any spectral color different from the UV light irradiated by the black light can be visually observed, such dye is determined to be "fluorescent dye" that emits fluorescence. The black light employable here may be commercially available (Trade name "SLUV-4", from AS ONE Corporation, for example).

The first ink preferably contains a resin particle (first resin particle) dyed with fluorescent dye. The fluorescent dye in the resin particle dyed with the fluorescent dye may be analyzed typically according to the procedures below. The resin particle separated from the ink by a common method is dissolved in an organic solvent such as chloroform, to thereby prepare a sample. The fluorescent dye is isolated from the thus prepared sample by HPLC (high performance liquid chromatography). The isolated dye is analyzed by a common method of structural analysis such as nuclear magnetic resonance (NMR) or matrix-assisted laser desorption/ionization mass spectrometry (MALDI-MS).

Examples of the fluorescent dye include C.I. Basic Red: 1, 1:1, 2, 4, 8, 11, 12, 13; Rhodamine: 19, 575; C.I. Acid Red 52; C.I. Solvent Red: 43, 44, 45, 49, 149; C.I. Disperse Red: 58, 60; C.I. Basic Violet: 1, 3, 10, 11, 11:1, 14; C.I. Basic Blue 7; C.I. Basic Green 1; C.I. Basic Yellow: 1, 2, 9, 13, 24, 37, 40, 96; C.I. Solvent Yellow: 7, 43, 44, 85, 98, 131, 160:1, 172, 196; C.I. Disperse Yellow: 82, 186; C.I. Solvent Orange: 5, 45, 63, 115; C.I. Disperse Orange 11; and C.I. Fluorescent Brightener: 9, 24, 28, 32, 52, 71, 134, 140, 154, 205, 220, 260, 351, 363. The SP value $S_D$ of the fluorescent dye is preferably 5.0 or more, and is preferably 20.0 or less.

Among them, from the viewpoint of the color developability, stability or the like of dye, C.I. Basic Red 1, C.I. Basic Red 1:1, C.I. Basic Violet 11, C.I. Basic Violet 11:1, C.I. Basic Yellow 40, C.I. Solvent Yellow 160:1, C.I. Solvent Yellow 196, C.I. Disperse yellow 82 and C.I. Fluorescent Brightener 351 are preferred.

The first ink may contain two or more kinds of fluorescent dyes as the coloring materials. In a case where the first ink contains two or more kinds of fluorescent dyes, the SP value $S_D$ of the fluorescent dye may be calculated by weighting with the molar concentration in the ink, and is specifically a value calculated on the basis of the following formula (B).

$$S_D = S_{D_1} \times \frac{C_{D_1}}{C_{D_{1+2+\ldots+n}}} + S_{D_2} \times \frac{C_{D_2}}{C_{D_{1+2+\ldots+n}}} + \ldots + S_{D_n} \times \frac{C_{D_n}}{C_{D_{1+2+\ldots+n}}} \tag{B}$$

(In the above formula (B), $S_{D_n}$ (n is an integer of 1 or more) represents the SP value of the (n)th fluorescent dye in the first ink, and $C_{D_n}$ (n is an integer of 1 or more) represents the molar concentration (mol/m$^3$) of the (n)th fluorescent dye in the first ink. $C_{D_{1+2+\ldots+n}}$ represents the total amount of molar concentration of the fluorescent dyes in the first ink.)

Content (% by mass) of the fluorescent dye in the first ink is preferably 0.1% by mass or more to 5.0% by mass or less based on the total mass of ink.

[First Resin Particle]

The first ink preferably contains the first resin particle dyed with the above-described fluorescent dye. Further, the SP value $S_R$ of a resin forming the first resin particle and the SP value $S_S$ of the first water-soluble organic solvent in the second ink preferably satisfy a relationship of the following formula (2):

$$|S_S - S_R| \leq 3.5 \quad (2),$$

and more preferably satisfy a relationship of the following formula (3):

$$|S_S - S_R| \leq 2.0 \quad (3).$$

The "resin particle" in the context of this patent specification means a resin dispersible in an aqueous medium, and can stay in the aqueous medium while keeping the particle size. Hence, the resin particle can stay dispersed in the ink, that is, in the form of resin emulsion.

Whether a certain resin is "resin particle" or not may be determined by the method below. First, prepared is a liquid in which a resin is neutralized with an alkali (sodium hydroxide, potassium hydroxide, etc.) whose content is equivalent to the acid value (solid resin content: 10% by mass). Next, the prepared liquid is diluted 10-fold (volume basis) with pure water to prepare a sample solution. If the sample solution, when observed by dynamic light scattering, showed the resin particle with measurable size, such resin particle may be determined to be the "resin particle". For the dynamic light scattering, employable is a particle size distribution analyzer (Trade name "UPA-EX150" from Nikkiso Co., Ltd., for example). Typical measurement conditions in this process include Set-Zero time: 30 seconds, number of runs: 3, measurement time: 180 seconds, shape: sphere and refractive index: 1.59. The particle size distribution analyzer and the measurement conditions to be employed are, of course, not limited to those described above. Use of the neutralized resin for the measurement of particle size is for the purpose of confirming whether the resin, having been made less likely to form the particle after neutralization, can still form the particle or not. The resin capable of keeping the particle form even under such condition can stay as the particle also in the aqueous ink.

The first resin particle is preferably formed of a resin having a polar group or an aromatic group and having a high affinity for fluorescent dye. Examples of the resin include an acrylic resin, a urethane-based resin and an olefin-based resin. Among them, an acrylic resin and a urethane-based resin are preferred, and an acrylic resin is more preferred. The SP value $S_R$ of a resin forming the first resin particle is preferably 5.0 or more, and is preferably 20.0 or less.

The resin particle such as a first resin particle employed here has the core portion, and the shell portion that covers the core portion, which is so-called core-shell structure can be used. In a case of a resin particle having a core-shell structure, it is preferred that fluorescent dye is contained mainly in the core portion. The shell portion has a function of suppressing the elution of the fluorescent dye from the core portion and improving the dispersion stability of the resin particle in an ink.

The core portion preferably has the aromatic group-containing unit and the cyano group-containing unit as the units constituting the core portion. With the core portion containing therein the aromatic group-containing unit and the cyano group-containing unit, the interaction between the fluorescent dye and the resin particle will be enhanced. For this reason, the resin particle can be efficiently dyed with the fluorescent dye.

It is preferred that the shell portion has the aromatic group-containing unit, the anionic group-containing unit and the crosslinking agent-derived unit. The shell portion, containing the aromatic group-containing unit, can cause hydrophobic interaction and π-π interaction with the aromatic group in the core portion. This makes the shell portion less likely to separate from the core portion, and makes the cyano group of the core portion less likely to expose on the surface of the resin particle, so that the elution of the fluorescent dye that dyes the resin particle can be prevented, and the decrease in the fluorescence intensity can be suppressed. The aromatic group-containing unit contained in the core portion, and the aromatic group-containing unit contained in the shell portion are preferably units of the same kind. "Units of the same kind" means that they are derived from the same monomer. With the aromatic group-containing unit contained in the core portion and the aromatic group-containing unit contained in the shell portion being the units of the same kind, the core-shell interaction will further be enhanced, and thereby the decrease in the fluorescence intensity can be further suppressed.

The monomer that later becomes, upon polymerization, the aromatic group-containing unit preferably has in the molecule thereof one polymerizable functional group such as ethylenic unsaturated bond. The monomer is specifically exemplified by styrene, vinyltoluene, p-fluoroetyrene, p-chlorostyrene, α-methylstyrene, 2-vinylnaphthalene, 9-vinylanthracene, 9-vinylcarbazole, phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth)acrylate and (1-pyrenyl)methyl (meth)acrylate. The monomer that later becomes, upon polymerization, the aromatic group-containing unit is preferably any of those free of anionic group or cyano group, and those preferably having a molecular weight of 300 or less, which is more preferably 200 or less. Among them, styrene and derivative thereof are preferred, and styrene and vinyltoluene are particularly preferred, from the viewpoint of excellence of reactivity during polymerization and excellence of stability of the obtainable resin particle.

The monomer that later becomes, upon polymerization, the cyano group-containing unit preferably has in the molecule thereof one polymerizable functional group such as ethylenic unsaturated bond. The monomer is specifically exemplified by acrylonitrile, methacrylonitrile, chloroacrylonitrile and 2-cyanoethyl (meth)acrylate. The monomer that later becomes, upon polymerization, the cyano group-containing unit is preferably any of those free of anionic group or aromatic group, and those preferably having a molecular weight of 300 or less, which is more preferably 200 or less. Among them, acrylonitrile and methacrylonitrile are particularly preferred, from the viewpoint of excellence of reactivity during polymerization.

The anionic group in the anionic group-containing unit preferably has in the molecule thereof one polymerizable functional group such as ethylenic unsaturated bond. The monomer is specifically exemplified by carboxylic acid group, phenolic hydroxy group and phosphoric ester group. Among them, carboxylic acid group is preferred from the viewpoint of good stability of the resin particle in the ink. The monomer that later becomes, upon polymerization, the anionic group-containing unit is exemplified by (meth)acrylic acid, p-vinylbenzoic acid, 4-vinylphenol, β-carboxyethyl (meth)acrylate, 2-hydroxyethyl methacrylate phospohate, 2-hydroxyethyl (meth)acrylate and 3-hydroxypropyl (meth)acrylate. The monomer that later becomes, upon polymerization, the anionic group-containing unit is preferably any of those free of aromatic group or cyano group, and those preferably having a molecular weight of 300 or less, which is more preferably 200 or less. Among them, (meth)

acrylic acid is particularly preferred. The anionic group in the anionic group-containing unit is preferably carboxylic acid group only. The anionic group may be present in either of an acid or salt form. In the latter case, either a portion or the whole of the salt may be dissociated. Examples of a cation which is the counter ion of the anionic group in salt form include alkali metal cations, ammonium and organic ammoniums.

The crosslinking agent that composes the crosslinking agent-derived unit may only be at least one kind, but two or more kinds of crosslinking agent are preferably used. The crosslinking agent, containing two or more kinds of crosslinking agent, preferably contains a glycidyl group-containing crosslinking agent as one of them. The glycidyl group-containing crosslinking agent reacts with and crosslinks the anionic group, such as carboxylic acid group, that resides in the shell portion. This can prevent the elution of the fluorescent dye that dyes the resin particle, and suppress the decrease in the fluorescence intensity. Moreover, use of two or more kinds of crosslinking agent can produce a densely crosslinked structure which can more effectively suppress the hydrophilicity of the shell portion from excessively increasing.

The crosslinking agent that later becomes, upon polymerization, the crosslinking agent-derived unit is exemplified by a compound having in the molecule thereof two or more polymerizable functional groups such as ethylenic unsaturated bond. Such crosslinking agent is exemplified by diene compounds such as butadiene and isoprene; bifunctional (meth)acrylates such as 1,4-butanediol di(meth)acrylate, 1,9-nonanediol di(meth)acrylate, (mono-, di-, tri-, poly-) ethylene glycol di(meth)acrylate, (mono-, di-, tri-, poly-) propylene glycol di(meth)acrylate, (mono-, di-, tri-, poly-) tetramethylene glycol di(meth)acrylate, ethylene oxide modified bisphenol A di(meth)acrylate, 2-hydroxy-3-(meth)acryloyloxypropyl methacrylate, propoxylated ethoxylated bisphenol A di(meth)acrylate, ethoxylated bisphenol A di(meth)acrylate, 9,9-bis(4-(2-(meth)acryloyloxyethoxy)phenyl)fluorene, tricyclodecanedimethanol di(meth)acrylate, 1,10-decanediol di(meth)acrylate, 1,6-hexanediol di(meth)acrylate, neopentyl glycol di(meth)acrylate, tricyclodecanedimethanol di(meth)acrylate, ethoxylated polypropylene glycol di(meth)acrylate and glycerin di(meth) acrylate; trifunctional (meth)acrylates such as tris(2-(meth) acryloyloxyethyl)isocyanurate, trimethylolpropane tri (meth)acrylate, tris(2-hydroxyethyl)isocyanurate tri(meth) acrylate, ethoxylated trimethylolpropane tri(meth)acrylate, pentaerythritol tri(meth)acrylate, propoxylated trimethylolpropane tri(meth)acrylate, propoxylated glyceryl tri(meth) acrylate, ethoxylated isocyanuric acid tri(meth)acrylate, ε-caprolactone modified tris(2-(meth)acryloyloxyethyl) isocyanurate and ethylene oxide modified trimethylolpropane tri(meth)acrylate; tetrafunctional (meth)acrylates such as ditrimethylolpropane tetra(meth)acrylate, ethoxylated pentaerythritol tetra(meth)acrylate and pentaerythritol tetra(meth)acrylate; and divinylbenzene.

The crosslinking agent preferably has a molecular weight of more than 200, which is more preferably more than 300, and is even more preferably 400 or more. The crosslinking agent preferably has in the molecule thereof two ethylenic unsaturated bonds. By employing the compound having in the molecule thereof two ethylenic unsaturated bonds as the crosslinking agent, the resin particle may be suppressed from causing aggregation otherwise possibly caused by excessive crosslinkage, and will have more uniform particle size. Among the compounds having in the molecules thereof two ethylenic unsaturated bonds, more preferred are divinylbenzene and ethylene glycol di(meth)acrylate.

The glycidyl group-containing crosslinking agent is exemplified by ethylene glycol diglycidyl ether, polyethylene glycol diglycidyl ether, sorbitol polyethylene glycol diglycidyl ether, glycerol polyglycidyl ether, diglycerol polyglycidyl ether, polyglycerol polyglycidyl ether, pentaerythritol polyglycidyl ether, propylene glycol diglycidyl ether, polypropylene glycol diglycidyl ether, trimethylolpropane polyglycidyl ether and neopentyl glycol diglycidyl ether. Among them, ethylene glycol diglycidyl ether is preferred, since it can form a high density crosslinked structure, and can very effectively suppress the hydrophilicity of the shell portion from excessively increasing.

The resin particle, when manufacturing, can employ a surfactant. The resin particle, manufactured in the presence of the surfactant, will advantageously have stabilized particle size and shape. The surfactant, if it were nonreactive, would tend to separate from the resin particle. The surfactant, if separated in the ink, the resin particle would be more likely to aggregate, and it would be difficult to suppress the concentration quenching. Hence, the surfactant employed for manufacture of the resin particle is preferably a reactive surfactant.

The reactive surfactant employable here is preferably a compound having a polymerizable functional group such as (meth)acryloyl group, maleyl group, vinyl group or allyl group, bound inside or at the terminal of the molecule composed of a hydrophilic part and a hydrophobic part. The hydrophilic part is exemplified by polyoxyalkylene chain such as ethylene oxide chain and propylene oxide chain. Meanwhile, the hydrophobic part is exemplified by alkyl group, aryl group and any structure combining these groups. The hydrophilic part and the hydrophobic part may be linked via a linking group such as ether group. The reactive surfactant preferably has a molecular weight of more than 200, which is more preferably more than 300, and is even more preferably 400 or more.

The reactive surfactant is specifically exemplified by polyoxyethylene nonylpropenylphenyl ether, ammonium polyoxyethylene nonylpropenylphenyl ether sulfate, ammonium polyoxyethylene-1-(allyloxymethyl)alkyl ether sulfate, α-hydro-ω-(1-alkoxymethyl-2-(2-propenyloxy)ethoxy)-poly(oxy-1,2-ethanediyl)), α-[1-{(allyloxy)methyl}-2-(nonylphenoxy)ethyl]-ω-hydroxypolyoxyethylene, α-sulfo-ω-(1-alkoxymethyl-2-(2-propenyloxy)ethoxy)-poly(oxy-1,2-ethanediyl) ammonium salt, sodium 2-sulfoethyl methacrylate, bis (polyoxyethylene polycyclic phenyl ether)methacrylate sulfuric ester salt, alkoxypolyethylene glycol methacrylate, alkoxypolyethylene glycol maleate, polyoxyalkylene alkenyl ether, ammonium polyoxyalkylene alkenyl ether sulfate, vinyl ether alkoxylate, alkylallylsulfosaccinic acid salt, polyoxyalkylene methacrylate sulfuric ester salt and unsaturated phosphoric acid ester. Among them, preferred is α-sulfo-ω-(1-alkoxymethyl-2-(2-propenyloxy)ethoxy)-poly(oxy-1,2-ethanediyl) ammonium salt (trade names "ADEKA REASOAP" SR-10S, SR-10, SR-20, SR-3025, SE-10N and SE-20N, from ADEKA Corporation).

The core portion and the shell portion of the resin particle may contain any unit other than those described above, without damaging the effects of the present invention. Such unit other than those described above preferably has one polymerizable functional group in the molecule, which is exemplified by a unit derived from ethylenic unsaturated monomer.

The ethylenic unsaturated monomer is exemplified by alkenes such as ethylene and propylene; alkyl (meth)acrylates such as methyl (meth)acrylate, ethyl (meth)acrylate, butyl (meth)acrylate, lauryl (meth)acrylate and hexadecyl (meth)acrylate; monocyclic (meth)acrylates such as cyclopropyl (meth)acrylate, cyclohexyl (meth)acrylate, cyclooctyl (meth)acrylate and cyclodecyl (meth)acrylate; bicyclic (meth)acrylates such as isobornyl (meth)acrylate and norbornyl (meth)acrylate; tricyclic (meth)acrylates such as adamanthyl (meth)acrylate, dicyclopentanyl (meth)acrylate and dicyclo pentenyloxyethyl (meth)acrylate; and nonionic hydrophilic group-containing (meth)acrylates such as methoxy(mono-, di-, tri-, poly-)ethylene glycol (meth)acrylate. The ethylenic unsaturated monomer is preferably any of those free of anionic group, cyano group or aromatic group, and preferably having a molecular weight of 300 or less, which is more preferably 200 or less. Among them, preferred are alkenes having 1 or more to 22 or less carbon atoms; and alkyl (meth)acrylate whose alkyl group having 1 or more to 22 or less carbon atoms. In view of easy controllability of physical properties of the resin particle, and obtainability of the resin particle that excels in polymerization stability, more preferred are alkyl (meth)acrylate whose alkyl group having 1 or more to 12 or less carbon atoms, and particularly preferred are methyl (meth)acrylate and ethyl (meth)acrylate.

As described previously, it is preferred that the core portion has the aromatic group-containing unit and the cyano group-containing unit. Percentage (% by mass) of the aromatic group-containing unit in the core portion is preferably 25% by mass or more to 90% by mass or less, and more preferably 35% by mass or more to 90% by mass or less. Percentage (% by mass) of the cyano group-containing unit in the core portion is preferably 10% by mass or more to 60% by mass or less, and more preferably 20% by mass or more to 55% by mass or less. Percentage (% by mass) of the additional unit in the core portion is preferably 15% by mass or less. The "additional unit" in the core portion is defined as a unit other than the aromatic group-containing unit and the cyano group-containing unit. The "additional unit" in the core portion preferably has, in the structure thereof, a reactive surfactant-derived unit. The core portion is preferably not cross-linked. That is, the "additional unit" in the core portion is preferably free of the crosslinking agent-derived unit.

Further, as described above, it is preferred that the shell portion has the aromatic group-containing unit, the anionic group-containing unit and the crosslinking agent-derived unit. Percentage (% by mass) of the aromatic group-containing unit in the shell portion is preferably 1% by mass or more to 60% by mass or less, and more preferably 10% by mass or more to 50% by mass or less. In addition, percentage (% by mass) of the anionic group-containing unit in the shell portion is preferably 5% by mass or more to 30% by mass or less, and more preferably 10% by mass or more to 20% by mass or less. Further, percentage (% by mass) of the crosslinking agent-derived unit in the shell portion is 30% by mass or more to 80% by mass or less, and is preferably 40% by mass or more to 70% by mass or less. Percentage (% by mass) of the additional unit in the shell portion is preferably 10% by mass or less, and more preferably 5% by mass or less. The "additional unit" in the shell portion is defined as a unit other than the aromatic group-containing unit, the anionic group-containing unit and the crosslinking agent-derived unit. The "additional unit" in the shell portion preferably has, in the structure thereof, a reactive surfactant-derived unit.

Percentage (% by mass) of the fluorescent dye in the first resin particle is preferably 1.0% by mass or more to 15.0% by mass or less, and more preferably 4.0% by mass or more to 8.0% by mass or less. Ratio by mass of the core portion and the shell portion of the resin particle represented by (core portion):(shell portion), with the total being 100, is preferably 50:50 to 95:5, and more preferably 60:40 to 90:10. Content (% by mass) of the first resin particle in the ink is preferably 1.0% by mass or more to 10.0% by mass or less based on the total mass of ink.

[Method for Manufacturing Resin Particle]

The resin particle may be manufactured by any of known methods including emulsion polymerization, mini-emulsion polymerization, seeded polymerization and phase inversion emulsification. Among them, since the resin particle having a more uniform particle size can be manufactured, emulsion polymerization and seeded polymerization are preferred. With the use of the resin particle having a more uniform particle size, the ejectability of the ink by an ink jet system can be more stabilized.

Method of dyeing of the resin particle is exemplified a method by which a monomer mixed liquid having a fluorescent dye dissolved therein is allowed to polymerize to produce the resin particle; and a method by which the resin particle and a fluorescent dye added thereto are heated. Among them, the method of heating the resin particle with the fluorescent dye added thereto is preferred, for its applicability to a wider variety of fluorescent dyes. The heating is preferably carried out without using dyeing auxiliary (water-soluble resin, surfactant, etc.). The water-soluble resin, when used as a dyeing auxiliary, would form a film to inhibit re-dispersion of the resin particle, and thereby the sticking restoration property of the ink would slightly degrade. The surfactant, when used as a dyeing auxiliary, would adversely affect the physical properties of ink, and thereby the ejectability of ink would slightly degrade.

[Method for Verifying Resin Particle]

Constitution of the resin particle may be verified by a method having processes (i) to (iii) below. Although the description below will deal with a case where the resin particle is extracted from the ink for analysis and verification, also the resin particle extracted from aqueous dispersion and so forth may be analyzed and verified in the same way.

(i) Isolation of Resin Particle

The resin particle contained in the ink may be separated and extracted by density gradient centrifugation. Among types of the density gradient centrifugation, density gradient sedimentation velocity method can separate and extract the resin particle, on the basis of difference of sedimentation coefficients among the ingredients. Meanwhile, among types of the density gradient centrifugation, density gradient sedimentation equilibrium method can separate and extract the resin particle, on the basis of difference of density among the ingredients.

(ii) Confirmation and Separation of Layer Structure

The resin particle is dyed and fixed with ruthenium tetroxide, and then embedded in an epoxy resin for stable immobilization. The resin particle embedded in the epoxy resin is then sliced using an ultramicrotome, and the cross-sectional face is observed under a scanning transmission electron microscope (STEM). The layer structure of the resin particle can be confirmed by observing a cross-sectional face that falls on the center of gravity of the resin particle. Also elements contained in the layers constituting the resin particle (core portion and shell portion) may be determined by quantitatively analyzing the sample resin particle embedded in the epoxy resin, using a STEM-EDX having an energy distributed X-ray spectrometer combined therein.

(iii) Analysis of Unit (Monomer) Constituting Resin in Individual Layers

The sample resin particle, from which the resins in the individual layers are separated, may exist in the form of dispersion liquid. The sample may alternatively be a film obtained by drying the resin particle. The sample resin particle is dissolved in an organic solvent, then separated into the individual layers by gel permeation chromatography (GPC), and resin components constituting the individual layers are fractionated. The thus fractionated resin components are subjected to element analysis. Apart from this, the thus fractionated resin was pretreated by acid digestion (with addition of hydrofluoric acid) or alkali fusion, and subjected to quantitative analysis of inorganic components based on induction-coupled plasma emission spectrometry. The layer of the resin particle having been formed by the fractionated resin component may be determined by comparing results of the element analysis and the quantitative analysis of inorganic components, with results of the element analysis using STEM-EDX obtained in (ii) above.

The fractionated resin is also analyzed by nuclear magnetic resonance (NMR) and matrix-assisted laser desorption/ionization mass spectrometry (MALDI-MS). These analyses give information on types and ratios of the unit (monomer) and crosslinking component constituting the resin. The monomer produced as a result of depolymerization is also detectable directly by analyzing the resin fractionated by pyrolytic chromatography.

[Method for Verifying First Resin Particle]

Whether a certain resin particle is dyed with fluorescent dye or not may be verified by the method described below. Herein, although the description below will deal with a case where the resin particle is extracted from the ink for analysis, also the resin particle extracted from aqueous dispersion and so forth may be analyzed in the same way. First, the resin particle is separated from the ink by density gradient centrifugation. The density gradient sedimentation velocity method can separate and extract the resin particle, on the basis of difference of sedimentation coefficients among the ingredients. Further, the density gradient sedimentation equilibrium method can separate and extract the resin particle, on the basis of difference of density among the ingredients. The obtained dispersion of the resin particle is dried and solidified, and then dissolved in an organic solvent which can solubilize both of the dye and the resin, to thereby obtain a solution. After that, the dye and the resin are separated by a technique such as gel permeation chromatography (GPC), high performance liquid chromatography (HPLC) or column chromatography.

The separated dye and resin are analyzed by a method of structural analysis such as nuclear magnetic resonance (NMR) or matrix-assisted laser desorption/ionization mass spectrometry (MALDI-MS). This gives information on the type of dye, and the type and composition ratio of the units (monomers) constituting the resin. Further, the monomer produced as a result of depolymerization is also detectable directly by analyzing the resin by pyrolytic chromatography. Subsequently, with the use of the type and composition ratio of the obtained monomer, the SP value of resin particle can be determined by the Fedors method described above.

(2) Second Ink

[First Water-Soluble Organic Solvent]

The second ink is an ink that contains no coloring material, and contains a first water-soluble organic solvent.

Further, the SP value $S_S$ of the first water-soluble organic solvent and the SP value $S_D$ of the fluorescent dye satisfy a relationship of the above-described formula (1).

Specific examples of the first water-soluble organic solvent include the following ones (numerical values inside the parentheses represent SP values at 25° C.). Monohydric alcohols having 1 to 4 carbon atoms such as methyl alcohol (13.8), ethyl alcohol (12.6), n-propyl alcohol (11.8), isopropyl alcohol (11.6), n-butyl alcohol (11.3), sec-butyl alcohol and tert-butyl alcohol; dihydric alcohols such as 1,2-propanediol (13.5), 1,3-butanediol (14.8), 1,4-butanediol (14.8), 1,5-pentanediol (14.2), 1,2-hexanediol (11.8), 1,6-hexanediol (13.5), 2-methyl-1,3-propanediol (14.8) and 3-methyl-1,5-pentanediol; polyhydric alcohols such as 1,2,7-heptanetriol (13.9), 1,2,6-hexanetriol (14.5), glycerin (16.4), trimethylol propane (15.9) and trimethylolethane; alkylene glycols such as ethylene glycol (14.8), diethylene glycol (15.0), triethylene glycol (13.6), tetraethylene glycol (12.8), butylene glycol, hexylene glycol and thiodiglycol; glycol ethers such as ethylene glycol monomethyl ether (12.0), diethylene glycol monomethyl ether (11.2), diethylene glycol monoethyl ether (10.9), triethylene glycol monoethyl ether (10.6) and triethylene glycol monobutyl ether (10.3); polyalkylene glycols having a number average molecular weight of 200 to 1,000 such as polyethylene glycol having a number average molecular weight of 600 (10.5), polyethylene glycol having a number average molecular weight of 1,000 (10.1) and polypropylene glycol; nitrogen-containing compounds such as 2-pyrrolidone (12.6), N-methyl-2-pyrrolidone (11.5), 1,3-dimethyl-2-imidazolidinone, N-methylmorpholine, urea (14.4), ethylene urea (14.2) and triethanolamine; and sulphur-containing compounds such as dimethyl sulfoxide (8.4) and bis(2-hydroxyethyl sulfone). The SP value $S_S$ of the first water-soluble organic solvent is preferably 10.0 or more, and is preferably 20.0 or less.

Content (% by mass) of the first water-soluble organic solvent in the second ink is preferably 1.0% by mass or more to 25.0% by mass or less based on the total mass of ink, and is more preferably 3.0% by mass or more to 20.0% by mass or less.

The second ink may contain two or more kinds of first water-soluble organic solvents. In a case where the second ink contains two or more kinds of first water-soluble organic solvents, the SP value $S_S$ of the first water-soluble organic solvent may be calculated by weighting with the molar concentration in the ink, and is specifically a value calculated on the basis of the following formula (C).

$$S_S = S_{S_1} \times \frac{C_{S_1}}{C_{S_{1+2+\ldots+n}}} + S_{S_2} \times \frac{C_{S_2}}{C_{S_{1+2+\ldots+n}}} + \ldots + S_{S_n} \times \frac{C_{S_n}}{C_{S_{1+2+\ldots+n}}} \quad (C)$$

(In the above formula (C), $S_{S_n}$ (n is an integer of 1 or more) represents the SP value of the (n)th first water-soluble organic solvent in the first ink, and $C_{S_n}$ (n is an integer of 1 or more) represents the molar concentration (mol/m$^3$) of the (n)th first water-soluble organic solvent in the first ink. $C_{S_{1+2+\ldots+n}}$ represents the total amount of molar concentration of the first water-soluble organic solvent in the first ink.)

Content (% by mass) of the first water-soluble organic solvent in the second ink, when expressed in mass ratio relative to content (% by mass) of the first resin particle in the first ink, is preferably 1.0 time or more. With the mass ratio less than 0.1 times, the first resin particle cannot be allowed to swell sufficiently, and therefore, it would be difficult to sufficiently reduce the association of the fluorescent dye. Hence, it would be difficult to sufficiently suppress the concentration quenching, and an effect of improving the fluorescence intensity would be slightly degraded. The mass ratio is preferably 5.0 or less, and more preferably 3.0 or less.

The "water-soluble organic solvent" usually means a liquid, but in the present invention, a solvent in a solid state at 25° C. (normal temperature) is also included in the water-soluble organic solvent. Specific examples of the water-soluble organic solvent that is in a solid state at 25° C. and is generally used for an aqueous ink include 1,6-hexanediol, trimethylol propane, ethylene urea, urea, and polyethylene glycol having a number average molecular weight of 1,000.

The second ink may contain a water-soluble organic solvent other than the first water-soluble organic solvent (that is, a water-soluble organic solvent that does not satisfy the relationship of formula (1)). In this case, the percentage (% by mass) of the first water-soluble organic solvent in all of the water-soluble organic solvents in the second ink is preferably 10.0% by mass or more to 90.0% by mass or less, and more preferably 20.0% by mass or more to 60.0% by mass or less.

[Resin: Water-Soluble Resin and Resin Particle]

It is preferred that the second ink further contains a resin. The resin may be either a water-soluble resin that is soluble in an aqueous medium, or a water-dispersible resin (water-insoluble resin) that can exist in a state of particle shapes dispersed in an aqueous medium. Whether a certain resin is water-soluble or not may be determined by the method below. First, prepared is a liquid in which a resin is neutralized with an alkali (sodium hydroxide, potassium hydroxide, etc.) whose content is equivalent to the acid value (solid resin content: 10% by mass). Next, the prepared liquid is diluted 10-fold (volume basis) with pure water to prepare a sample solution. Further, when the particle size of the resin in the sample solution is measured by dynamic light scattering, if any particle having a particle size is not observed, such a resin may be determined to be the water-soluble. For the dynamic light scattering, employable is a particle size distribution analyzer (Trade name "UPA-EX150" from Nikkiso Co., Ltd., for example). Typical measurement conditions in this process include Set-Zero time: 30 seconds, number of runs: 3, measurement time: 180 seconds, shape: sphere and refractive index: 1.59. The particle size distribution analyzer and the measurement conditions to be employed are, of course, not limited to those described above. Use of the neutralized resin for the measurement of particle size is for the purpose of confirming whether the resin, having been made less likely to form the particle after neutralization, can still form the particle or not.

As the resin to be contained in a second ink, a water-soluble resin may be used. That is, it is preferred that the second ink further contains a water-soluble resin. If the second ink containing a water-soluble resin is used, the water-soluble resin enters the first resin particle that has swelled by a first water-soluble organic solvent. As a result, the concentration quenching generated due to the association of fluorescent dye can be suppressed, and the fluorescence intensity of the image can be improved. Content (% by mass) of the water-soluble resin in the second ink is preferably 0.1% by mass or more to 5.0% by mass or less based on the total mass of the second ink. Content (% by mass) of the water-soluble resin in the second ink, when expressed in mass ratio relative to content (% by mass) of the first resin particle in the first ink, is preferably 0.1 time or more. With the mass ratio less than 0.1 times, a sufficient amount of resin would be difficult to stay in a layer of the first resin particle, and an effect of suppressing the concentration quenching would be slightly degraded. The mass ratio is preferably 3.0 or less, and more preferably 1.0 or less.

As the resin to be contained in the second ink, a resin particle may also be used. That is, it is preferred that the second ink further contains the second resin particle. If the second ink containing a resin particle is used, the second resin particle enters among a plurality of the first resin particles, and thus the distance between the plurality of the first resin particles that are adjacent to each other can be extended. As a result, the concentration quenching can be further suppressed, and the fluorescence intensity of the image can be further improved. Content (% by mass) of the second resin particle in the second ink is preferably 0.10% by mass or more to 5.0% by mass or less based on the total mass of ink. Note that since the second ink is a clear ink that contains no coloring material, the second resin particle embraces no coloring material.

It is preferred that a cumulative 50% particle diameter in volume-based particle size of the second resin particle in the second ink, when expressed in ratio relative to cumulative 50% particle diameter in volume-based particle size of the first resin particle in the first ink, is 0.3 times or more to 2.0 times or less. With the ratio less than 0.3, the distance between the plurality of the first resin particles that are adjacent to each other cannot be sufficiently extended, it would be difficult to suppress the concentration quenching, and an effect of improving the fluorescence intensity would be slightly degraded. On the other hand, with the ratio more than 2.0 times, the resin particle may be less likely to enter between the plurality of the first resin particles that are adjacent to each other. For this reason, the distance between a plurality of the first resin particles cannot be extended, it would be difficult to suppress the concentration quenching, and an effect of improving the fluorescence intensity would be slightly degraded.

The second resin particle is preferably a resin particle having a core-shell structure. With the use of the second ink containing a second resin particle having a core-shell structure, an image with higher fluorescence intensity can be recorded. In the resin particle having a core-shell structure, usually, the functions of the core portion and the shell portion are clearly separated. For example, a resin particle, which has a core portion containing a unit that contains no acidic group and a shell portion containing an acidic group-containing unit, has a favorable dispersion stability as compared with a resin particle having a single layer structure even if the acid values are the same as each other, and therefore, the particle size distribution of resin particle becomes narrow. Hence, since the cumulative 50% particle diameter in volume-based particle size of the second resin particle can be easily controlled, an image with higher fluorescence intensity can be recorded with the use of the second ink containing the second resin particle. Further, since a resin particle having a core portion that contains a hydrophobic group-containing unit is more likely to remain in a layer of the first resin particle, an image with higher fluorescence intensity can be recorded with the use of the second ink containing the second resin particle.

As the water-soluble resin or the resin constituting the second resin particle, a resin having an anionic group (anionic resin) is preferred, and a resin having no cationic group is preferred. Specific examples of the resin include an acrylic resin, an olefin-based resin and a urethane-based resin. Among them, an acrylic resin is preferred. As the acrylic resin, an acrylic resin having a unit derived from (meth)acrylic acid or a unit derived from (meth)acrylic ester can be used. Among them, an acrylic resin having a hydrophilic unit or a hydrophobic unit is preferred.

Examples of the monomer that later becomes, upon polymerization, the hydrophilic unit include an acidic monomer having a carboxylic acid group such as (meth)acrylic acid, itaconic acid, maleic acid or fumaric acid; a monomer having a hydroxy group such as 2-hydroxyethyl (meth) acrylate or 3-hydroxypropyl (meth)acrylate; and a monomer having an ethylene oxide group such as methoxy (mono-, di-, tri-, poly-)ethylene glycol (meth)acrylate.

Examples of the monomer that later becomes, upon polymerization, the hydrophobic unit include a monomer having an aromatic ring such as styrene, α-methyl styrene or benzyl (meth)acrylate; and a monomer having an aliphatic group such as ethyl (meth)acrylate, methyl (meth)acrylate, (iso)propyl (meth)acrylate, (n-, iso-, t-)butyl (meth)acrylate or 2-ethylhexyl (meth)acrylate.

(Aqueous Medium)

Each of the inks composing an ink set is an aqueous ink containing at least water as the aqueous medium. The ink may further contain a water-soluble organic solvent as the aqueous medium. The water is preferably deionized water or ion-exchanged water. Content (% by mass) of water in the ink is preferably 50.0% by mass or more to 95.0% by mass or less based on the total mass of ink. The water-soluble organic solvent may be any of those commonly used for the ink. Examples include alcohols, (poly)alkylene glycols, glycol ethers, nitrogen-containing compounds and sulfur-containing compounds. Content (% by mass) of the water-soluble organic solvent in the ink is preferably 3.0% by mass or more to 50.0% by mass or less based on the total mass of ink. For the second ink, the content of the water-soluble organic solvent is a value containing the first water-soluble organic solvent.

(Other Additives)

Each of the inks composing an ink set may further contain various optional additives such as surfactant, pH adjuster, antirust agent, antiseptic agent, anti-mold agent, antioxidant, anti-reduction agent, evaporation promoter, chelating agent and other resin. In general, these additives have a considerably low content in the ink, and the "direct" effect of the additives on the swelling of the first resin particle is low. Hence, in the present invention, these additives are not included in the "water-soluble organic solvent", and are not subjected to the calculation of the SP value. Note that although the first ink may contain a coloring material such as pigment or dye (non-fluorescent dye), it is usually unnecessary to add the coloring material as described above. The second ink is a clear ink, and does not contain any coloring material (including fluorescent dye).

(Physical Properties of Ink)

Each of the inks composing an ink set, being an aqueous ink applicable to the ink jet system, preferably has physical properties that are suitably controlled. More specifically, the ink preferably has a surface tension at 25° C., when measured by the plate method, of 20 mN/m or more to 60 mN/m or less, which is more preferably 25 mN/m or more to 45 mN/m or less. Viscosity of the ink at 25° C. is preferably 1.0 mPa·s or more to 10.0 mPa·s or less, and more preferably 1.0 mPa·s or more to 5.0 mPa·s or less. pH of the ink at 25° C. is preferably 7.0 or more to 10.0 or less.

(Ink Jet Recording Method and Ink Jet Recording Apparatus)

The ink jet recording method of the present invention is a method by which an image is recorded on a recording medium with each of the aforementioned aqueous inks composing the ink set of the present invention, ejected from the recording head based on an ink jet system. Further, the ink jet recording apparatus of the present invention has a recording head based on an ink jet system, from which each of the aforementioned aqueous inks composing the ink set of the present invention is ejected. System for ejecting ink is exemplified by a system of applying mechanical energy to the ink, and a system of applying heat energy to the ink. In the present invention, the system of applying heat energy to the ink before ejection is particularly preferred. Processes in the ink jet recording method may be any of known ones, except that the ink of the present invention is used.

Figure 1B:
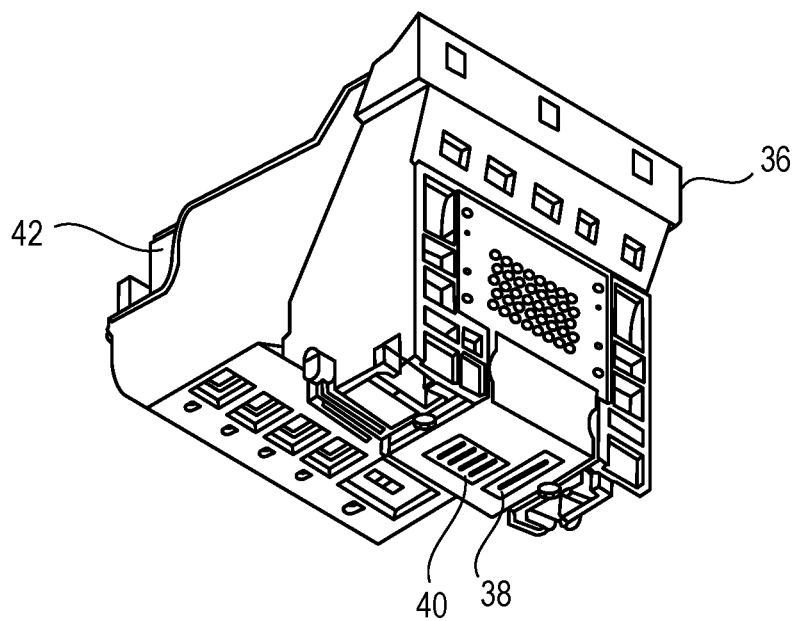
FIG. 1B is a perspective view illustrating a head cartridge of an ink jet recording apparatus, used for the ink jet recording method of the present invention.

FIGS. 1A and 1B are drawings schematically illustrating an exemplary ink jet recording apparatus used for the ink jet recording method of the present invention, wherein FIG. 1A is a perspective view illustrating a major part of the recording apparatus, and FIG. 1B is a perspective view illustrating a head cartridge. The ink jet recording apparatus has a conveying unit (not illustrated) that conveys a recording medium 32, and a carriage shaft 34. The carriage shaft 34 is designed to have a head cartridge 36 mounted thereon. The head cartridge 36 has recording heads 38 and 40, and is designed to have an ink cartridge 42 set thereon. In the duration over which the head cartridge 36 is conveyed in the main scanning direction along the carriage shaft 34, the ink (not illustrated) is ejected from the recording heads 38 and 40 towards the recording medium 32. Then as a result of conveyance of the recording medium 32 by the conveying unit (not illustrated) in the sub-scanning direction, an image is recorded on the recording medium 32.

EXAMPLES

The present invention will further be detailed below, referring to Examples and Comparative Examples. The present invention is, however, by no means limited to these Examples, without departing from the spirit thereof. All amounts of ingredients given in "part(s)" or "%" are on the mass basis unless otherwise specifically noted.

<Measurement Condition of Cumulative 50% Particle Diameter in Volume-Based Particle Size of Resin Particle>

The particle size (cumulative 50% particle diameter in volume-based particle size) of resin particle was measured according to the procedures below. First, a resin was diluted with pure water to prepare a sample for measurement so that the content of the resin was 0.4%. Further, the particle size of the resin particle was measured with the use of a particle size distribution analyzer (Trade name "UPA-EX150" from Nikkiso Co., Ltd.) based on dynamic light scattering, under conditions including Set-Zero time: 30 seconds, number of runs: 3, measurement time: 180 seconds, shape: sphere and refractive index: 1.59. Hereinafter, the resin whose particle size had been measured was referred to as "resin particle", and the resin whose particle size had not been measured was referred to as "water-soluble resin".

<Preparation of Aqueous Dispersion of First Resin Particle>

(First Resin Particles 1 to 3)

A reaction vessel equipped with a stirrer was set on a warm water bath. In the reaction vessel, poured was 1,178 parts of water, and the inner temperature was kept at 70° C. Styrene, acrylonitrile and a reactive surfactant (trade name "ADEKA REASOAP SR-10", from ADEKA Corporation) were mixed according to the amount of charge (parts) and proportion (%) summarized in Table 1-1, to thereby prepare a mixed monomer solution for forming the core portion. On the other hand, 1.9 parts of potassium persulfate and 659 parts of water were mixed to prepare an aqueous polymerization initiator solution 1. The mixed monomer solution for forming the core portion and the aqueous polymerization initiator solution 1 were added dropwise in parallel into the reaction vessel over 60 minutes. After completion of the dropwise addition, the content was kept stirred for additional 30 minutes, to thereby obtain a particle later becoming the core portion of the resin particle.

Next, styrene, methacrylic acid, ethylene glycol dimethacrylate, ethylene glycol diglycidyl ether and a reactive surfactant were mixed according to the amount of charge (parts) and proportion (%) summarized in Table 1-2, to thereby prepare a mixed monomer solution for forming the shell portion. As the ethylene glycol diglycidyl ether, "Denacol EX-810" (trade name, from Nagase ChemteX Corporation) was used. The reactive surfactant employed here was "ADEKA REASOAP SR-10" (trade name, from ADEKA Corporation). On the other hand, 0.1 parts of potassium persulfate and 133 parts of water were mixed to prepare an aqueous polymerization initiator solution 2. Into the reaction vessel containing the particle later becoming the core portion, added dropwise were the mixed monomer solution for forming the shell portion and the aqueous polymerization initiator solution 2, in parallel over 10 minutes. After completion of the dropwise addition, the content was kept stirred at 80° C. for 10 minutes so as to synthesize the shell portion, to thereby synthesize a resin particle having a core-shell structure in which the particle constituting the core portion is covered with the resin constituting the shell portion.

A proper amount of an aqueous 8 mol/L potassium hydroxide solution was then added in the reaction vessel, and the liquid was adjusted to pH 8.5. Powder of the fluorescent dye was added according to the amount of charge (parts) and proportion (%) summarized in Table 1-3, and the content was heated to 80° C. The content was then stirred for 2 hours, to thereby attach the fluorescent dye to the resin particle. A proper amount of an aqueous 8 mol/L potassium hydroxide solution was then added in the reaction vessel, and the liquid was adjusted to pH 8.5. A proper amount of water was further added, to thereby obtain an aqueous dispersion of each resin particle with a resin particle content of 20%. Table 1-3 summarizes the particle size (cumulative 50% particle diameter in volume-based particle size) and SP value of the thus obtained resin particle.

Abbreviations in Tables 1-1 to 1-3 are as follows.
St: styrene
AN: acrylonitrile
MAA: methacrylic acid
EDMA: ethylene glycol dimethacrylate
EX-810: ethylene glycol diglycidyl ether (trade name "Denacol EX-810", from Nagase ChemteX Corporation)
BR1: C.I. Basic Red 1, SP value: 9.9
BV11: C.I. Basic Violet 11, SP value: 9.9
DY82: C.I. Disperse Yellow 82, SP value: 12.5
SY196: C.I. Solvent Yellow 196, SP value: 12.5
FB351: C.I. Fluorescent Brightener 351, SP value: 11.6

TABLE 1

Preparation conditions and characteristics of first resin particle

| | Core portion | | | | Shell portion | | | | | |
|---|---|---|---|---|---|---|---|---|---|---|
| First resin particle | Charged monomer (parts) | Proportion of charged monomers (%) | | | Charged monomer (parts) | Proportion of charged monomers (%) | | | | |
| | | St | AN | Reactive surfactant | | St | MAA | EDMA | EX-810 | Reactive surfactant |
| 1 | 466 | 47 | 50 | 3 | 80 | 19 | 15 | 40 | 25 | 1 |
| 2 | 466 | 47 | 50 | 3 | 80 | 19 | 15 | 40 | 25 | 1 |
| 3 | 466 | 47 | 50 | 3 | 80 | 19 | 15 | 40 | 25 | 1 |

| | Fluorescent dye | | | | | | | | |
|---|---|---|---|---|---|---|---|---|---|
| First resin particle | Charged monomer (parts) | Proportion of amount of charge (%) | | | | | Percentage in resin particle (%) | Particle size (nm) | SP value of resin (cal/cm$^3$)$^{1/2}$ |
| | | BR 1 | BV 11 | DY 82 | SY 196 | FB 351 | | | |
| 1 | 29 | 80 | 20 | | | | 5.0 | 80 | 10.1 |
| 2 | 29 | | | 80 | 20 | | 5.0 | 80 | 10.1 |
| 3 | 29 | | | | | 100 | 5.0 | 80 | 10.1 |

(First Resin Particle 4)

A commercially available aqueous dispersion (trade name "NKW3205E", from Nippon Keiko Kagaku Co., Ltd.) containing a resin particle dyed with fluorescent dye was used as an aqueous dispersion of first resin particle 4. The type of fluorescent dye was C.I. Basic Yellow 40 (SP value: 9.9), the SP value of resin was 10.0, the particle size (cumulative 50% particle diameter in volume-based particle size) of resin particle was 108 nm, and the content of resin particle was 35.0%.

(First Resin Particle 5)

A commercially available aqueous dispersion (trade name "NKW3207E", from Nippon Keiko Kagaku Co., Ltd.) containing a resin particle dyed with fluorescent dye was used as an aqueous dispersion of first resin particle 5. The type of fluorescent dye was C.I. Basic Red 1:1 (SP value: 11.3), the SP value of resin was 10.0, the particle size (cumulative 50% particle diameter in volume-based particle size) of resin particle was 104 nm, and the content of resin particle was 35.0%.

(First Resin Particle 6)

Resin particle was synthesized in accordance with the method disclosed in "Example 2" of Japanese Patent Application Laid-Open No. 2003-073599, and then a proper amount of ion exchanged water was added, to thereby obtain an aqueous dispersion of first resin particle 6. The type of fluorescent dye was oil soluble dye (trade name "Lumogen F Orange 240", from BASF SE, SP value: 12.0), the SP value of resin was 9.0, the particle size (cumulative 50% particle diameter in volume-based particle size) of resin particle was 95 nm, and the content of resin particle was 35.0%.

<Preparation of Aqueous Dispersion of Second Resin Particle>

Into a four-neck flask equipped with a stirrer, a reflux condenser and a nitrogen gas introduction pipe, 100.0 parts of ethylene glycol monobutyl ether was placed, and nitrogen gas was introduced, and the content was allowed to heat to 110° C. under stirring. A mixture of 38.0 parts of 2-ethylhexyl acrylate, 34.0 parts of methyl methacrylate and 28.0 parts of acrylic acid, and an ethylene glycol monobutyl ether solution of 1.3 parts of t-butyl peroxide (polymerization initiator) were added dropwise into the flask over 3 hours. After performing the aging for 2 hours, ethylene glycol monobutyl ether was removed under reduced pressure, to thereby obtain a resin (shell polymer) in a solid state. Into the obtained shell polymer, potassium hydroxide whose amount was equivalent to the acid value, and a proper amount of ion exchanged water were added, and the neutralizing and dissolving were performed at 80° C., to thereby obtain an aqueous solution of shell polymer with a solid content (shell polymer) of 30.0%. The shell polymer had an acid value of 216 mgKOH/g and a weight average molecular weight of 15,000.

Into a four-neck flask equipped with a stirrer, a reflux condenser and a nitrogen gas introduction pipe, an aqueous solution of shell polymer in an amount summarized in Table 2 was placed, and nitrogen gas was introduced, and the content was allowed to heat to 80° C. under stirring. Into the flask, a mixture (mixture of styrene and methyl methacrylate with a mass ratio of 4:1) in an amount summarized in Table 2 and water were added, and then a liquid in which 1.0 part of potassium persulfate (polymerization initiator) had been dissolved in 16.7 parts of water was added dropwise into the flask over 3 hours. After performing the aging for 2 hours, a proper amount ion exchanged water was added into the flask to adjust the solid content. As a result, an aqueous dispersion of each resin particle having a resin content (solid content) of 6.0% and having a core-shell structure was obtained. The particle size (cumulative 50% particle diameter in volume-based particle size) of resin particle in each of the obtained aqueous dispersions is summarized in Table 2.

TABLE 2

Preparation conditions and characteristics of second resin particle

| Second resin particle | Aqueous solution of shell polymer (parts) | Mixture (parts) | Water (parts) | Particle size (nm) |
|---|---|---|---|---|
| 1 | 27.5 | 5.5 | 67.0 | 90 |
| 2 | 0.6 | 0.1 | 99.3 | 18 |
| 3 | 1.3 | 0.3 | 98.4 | 20 |
| 4 | 53.7 | 10.7 | 35.6 | 160 |
| 5 | 57.4 | 11.5 | 31.1 | 170 |

<Preparation of Aqueous Solution of Water-Soluble Resin>

(Acrylic Resin 1)

Into a four-neck flask equipped with a stirrer, a reflux condenser and a nitrogen gas introduction pipe, 100.0 parts of ethylene glycol monobutyl ether was placed, and nitrogen gas was introduced, and the content was allowed to heat to 110° C. under stirring. A mixture of 39.5 parts of styrene, 40.0 parts of methyl methacrylate and 20.5 parts of acrylic acid, and an ethylene glycol monobutyl ether solution of 1.3 parts of t-butyl peroxide (polymerization initiator) were added dropwise into the flask over 3 hours. After performing the aging for 2 hours, the ethylene glycol monobutyl ether was removed under reduced pressure, to thereby obtain a resin in a solid state. Into the obtained resin, potassium hydroxide whose amount was equivalent to the acid value, and a proper amount of ion exchanged water were added, and the neutralizing and dissolving were performed at 80° C., to thereby obtain an aqueous solution of acrylic resin 1 (water-soluble acrylic resin) having a resin content (solid content) of 20.0%. The acrylic resin 1 had an acid value of 155 mgKOH/g and a weight average molecular weight of 8,000.

(Urethane Resin 1)

Into a four-neck flask equipped with a stirrer, a reflux condenser and a nitrogen gas introduction pipe, 31.6 parts of polypropylene glycol (number average molecular weight: 2000) was placed and methyl ethyl ketone was added to dissolve the polypropylene glycol. Into the flask, 46.9 parts of isophorone diisocyanate and 21.5 parts of dimethylol propionic acid were added, and the content was allowed to react at 75° C. for 1 hour to obtain a prepolymer solution. The obtained prepolymer solution was cooled down to 60° C., and then into the solution, a potassium hydroxide aqueous solution was added to neutralize the acid groups. The content was then cooled down to 40° C., to which ion exchanged water was added, and the obtained mixture was emulsified while keeping the mixture stirred at high speed using a homomixer, and then 2.1 parts of ethylenediamine (chain extender) was added, and the content was subjected to chain extension reaction at 30° C. for 12 hours. When the presence of isocyanate groups was no longer confirmed by the analysis with Fourier transform infrared spectrophotometer (FT-IR), the methyl ethyl ketone was distilled off by heating under reduced pressure, to thereby obtain an aqueous solution of urethane resin 1 (water-soluble urethane resin) having a resin content (solid content) of 20.0%. The urethane resin 1 had an acid value of 90 mgKOH/g and a weight average molecular weight of 30,000.

<Preparation of Ink>

The individual ingredients (in %) listed in the upper lines of Tables 3 and 4 were mixed, thoroughly stirred, and filtered under pressure through a cellulose acetate filter (from ADVANTEC Co., LTD.) with a pore size of 0.8 μm, to thereby prepare each ink. The polyethylene glycol had a number average molecular weight of 1,000. In Tables 3 and 4, the numerical values inside the parentheses accompanying water-soluble organic solvents represent SP values of the water-soluble organic solvents. Lower lines of Tables 3 and 4 list properties of the inks. Details of the ingredients in Tables 3 and 4 are as follows.

Aqueous solution of C.I. Basic Red 1, content of dye: 1.0%, SP value: 9.9

C.I. Fluorescent Brightener 351, SP value: 11.6

Aqueous solution of C.I. Acid Red 52, content of dye: 10.0%, SP value: 11.2

Acetylenol E100, surfactant (from Kawaken Fine Chemicals Co., Ltd.)

Proxel GXL(S), antifungal agent (from Arch Chemical, Inc.)

TABLE 3

Composition and characteristics of first ink

| | First ink | | | | | | | | | |
|---|---|---|---|---|---|---|---|---|---|---|
| | I-1 | I-2 | I-3 | I-4 | I-5 | I-6 | I-7 | I-8 | I-9 | I-10 |
| Aqueous dispersion of first resin particle 1 | 35.0 | | | | | | | 35.0 | | |
| Aqueous dispersion of first resin particle 2 | | 35.0 | | | | | | | | |
| Aqueous dispersion of first resin particle 3 | | | 35.0 | | | | | | | |
| Aqueous dispersion of first resin particle 4 | | | | 20.0 | | | | | | |
| Aqueous dispersion of first resin particle 5 | | | | | 20.0 | | | | | |
| Aqueous solution of C.I. Basic Red 1 | | | | | | 30.0 | | | | |
| C.I. Fluorescent Brightener 351 | | | | | | | 0.3 | | | |
| Aqueous solution of C.I. Acid Red 52 | | | | | | | | | 10.0 | |
| Aqueous dispersion of first resin particle 6 | | | | | | | | | | 22.9 |
| Aqueous dispersion of second resin particle 1 | | | | | | | | 33.3 | | |
| Aqueous solution of acrylic resin 1 | | | | | | | | 10.0 | | |
| Glycerin | 20.0 | 20.0 | 20.0 | 20.0 | 20.0 | 20.0 | 20.0 | 10.0 | 15.0 | |
| 1,2-Hexanediol | | | | | | | | 10.0 | | |
| 1,5-Pentanediol | | | | | | | | | 25.0 | |
| Triethylene glycol monobutyl ether | | | | | | | | | 5.0 | |
| Trimethylglycine | | | | | | | | | | 10.0 |
| Urea | | | | | | | | | | 5.0 |
| Sodium 2-ethylhexyl sulfosuccinate | | | | | | | | | | 1.0 |
| Acetylenol E100 | 1.0 | 1.0 | 1.0 | 1.0 | 1.0 | 1.0 | 1.0 | 1.0 | | |
| Proxel GXL(S) | 0.2 | 0.2 | 0.2 | 0.2 | 0.2 | 0.2 | 0.2 | 0.2 | | |
| Ion-exchanged water | 43.8 | 43.8 | 43.8 | 58.8 | 58.8 | 48.8 | 78.5 | 0.5 | 45.0 | 61.1 |
| Content $C_{R1}$ of first resin particle (%) | 7.0 | 7.0 | 7.0 | 7.0 | 7.0 | 0.0 | 0.0 | 7.0 | 0.0 | 8.0 |
| SP value $S_D$ of fluorescent dye $(cal/cm^3)^{1/2}$ | 9.9 | 12.5 | 11.6 | 11.3 | 10.0 | 9.9 | 11.6 | 9.9 | 11.2 | 12.0 |
| SP value $S_R$ of first resin particle $(cal/cm^3)^{1/2}$ | 10.1 | 10.1 | 10.1 | 10.0 | 10.0 | — | — | 10.1 | — | 9.0 |
| Particle size $D_1$ of first resin particle (nm) | 80 | 80 | 80 | 108 | 104 | — | — | 80 | — | 95 |

TABLE 4

Composition and characteristics of second ink

| | Second ink | | | | | | | | | |
|---|---|---|---|---|---|---|---|---|---|---|
| | II-1 | II-2 | II-3 | II-4 | II-5 | II-6 | II-7 | II-8 | II-9 | II-10 |
| Aqueous solution of acrylic resin 1 | 10.0 | 10.0 | 10.0 | | 10.0 | 10.0 | 10.0 | 10.0 | | 10.0 |
| Aqueous solution of urethane resin 1 | | | | 10.0 | | | | | | |
| Aqueous dispersion of second resin particle 1 | 33.3 | 33.3 | 33.3 | 33.3 | 33.3 | 33.3 | 33.3 | 33.3 | 33.3 | |
| Aqueous dispersion of second resin particle 2 | | | | | | | | | | |
| Aqueous dispersion of second resin particle 3 | | | | | | | | | | |
| Aqueous dispersion of second resin particle 4 | | | | | | | | | | |
| Aqueous dispersion of second resin particle 5 | | | | | | | | | | |
| Glycerin (16.4) | 10.0 | | 10.0 | 10.0 | 10.0 | 10.0 | 10.0 | 10.0 | 10.0 | 10.0 |
| 1,2,7-Heptanetriol (13.9) | | | | | | 10.0 | | | | |
| Triethylene glycol (13.6) | | 2.0 | | 10.0 | | | | | | |

TABLE 4-continued

Composition and characteristics of second ink

| | | | | | | | | | | |
|---|---|---|---|---|---|---|---|---|---|---|
| 2-Pyrrolidone (12.6) | | | | | | | | 10.0 | | |
| Ethylene glycol monomethyl ether (12.0) | | | | | | | 10.0 | | | |
| 1,2-Hexanediol (11.8) | 10.0 | 18.0 | | 10.0 | | | | | 10.0 | 10.0 |
| Polyethylene glycol (10.1) | | | 10.0 | | | | | | | |
| Acetylenol E100 | 1.0 | 1.0 | 1.0 | 1.0 | 1.0 | 1.0 | 1.0 | 1.0 | 1.0 | 1.0 |
| Proxel GXL(S) | 0.2 | 0.2 | 0.2 | 0.2 | 0.2 | 0.2 | 0.2 | 0.2 | 0.2 | 0.2 |
| Ion-exchanged water | 35.5 | 35.5 | 35.5 | 35.5 | 35.5 | 35.5 | 35.5 | 35.5 | 45.5 | 68.8 |
| Content $C_{R2}$ of water-soluble resin (%) | 2.0 | 2.0 | 2.0 | 2.0 | 2.0 | 2.0 | 2.0 | 2.0 | 0.0 | 2.0 |
| Particle size $D_2$ of second resin particle (nm) | 90 | 90 | 90 | 90 | 90 | 90 | 90 | 90 | 90 | — |

| | Second ink | | | | | | | | | |
|---|---|---|---|---|---|---|---|---|---|---|
| | II-11 | II-12 | II-13 | II-14 | II-15 | II-16 | II-17 | II-18 | II-19 | II-20 |
| Aqueous solution of acrylic resin 1 | 3.0 | 3.5 | 10.0 | 10.0 | 10.0 | 10.0 | 10.0 | 10.0 | | 10.0 |
| Aqueous solution of urethane resin 1 | | | | | | | | | | |
| Aqueous dispersion of second resin particle 1 | 33.3 | 33.3 | | | | | 33.3 | 33.3 | | 33.3 |
| Aqueous dispersion of second resin particle 2 | | | 33.3 | | | | | | | |
| Aqueous dispersion of second resin particle 3 | | | | 33.3 | | | | | | |
| Aqueous dispersion of second resin particle 4 | | | | | 33.3 | | | | | |
| Aqueous dispersion of second resin particle 5 | | | | | | 33.3 | | | | |
| Glycerin (16.4) | 10.0 | 10.0 | 10.0 | 10.0 | 10.0 | 10.0 | 14.0 | 13.0 | 10.0 | 20.0 |
| 1,2,7-Heptanetriol (13.9) | | | | | | | | | | |
| Triethylene glycol (13.6) | | | | | | | | | | |
| 2-Pyrrolidone (12.6) | | | | | | | | 10.0 | | |
| Ethylene glycol monomethyl ether (12.0) | | | | | | | | | | |
| 1,2-Hexanediol (11.8) | 10.0 | 10.0 | 10.0 | 10.0 | 10.0 | 10.0 | 6.0 | 7.0 | | |
| Polyethylene glycol (10.1) | | | | | | | | | | |
| Acetylenol E100 | 1.0 | 1.0 | 1.0 | 1.0 | 1.0 | 1.0 | 1.0 | 1.0 | 1.0 | 1.0 |
| Proxel GXL(S) | 0.2 | 0.2 | 0.2 | 0.2 | 0.2 | 0.2 | 0.2 | 0.2 | 0.2 | 0.2 |
| Ion-exchanged water | 42.5 | 42.0 | 35.5 | 35.5 | 35.5 | 35.5 | 35.5 | 35.5 | 78.8 | 35.5 |
| Content $C_{R2}$ of water-soluble resin (%) | 0.6 | 0.7 | 2.0 | 2.0 | 2.0 | 2.0 | 2.0 | 2.0 | 0.0 | 2.0 |
| Particle size $D_2$ of second resin particle (nm) | 90 | 90 | 18 | 20 | 160 | 170 | 90 | 90 | — | 90 |

<Evaluation>

An ink set by a combination of the respective inks listed on the left side of Table 5 was prepared. Further, each of the inks was filled in an ink cartridge, and mounted on an ink jet recording apparatus (Trade name "PIXUS PRO-10S", from Canon Inc.) equipped with a recording head that ejects ink with the aid of heat energy. The first ink was set at a position of cyan ink, and the second ink was set at a position of chroma optimizer ink. With such ink jet recording apparatus, a recording duty of 100% is defined when an image is recorded in a unit area of 1/600 inch×1/600 inch, by applying 8 ink droplets, each droplet having a mass of 3.8 ng±10%. With the use of the aforementioned ink jet recording apparatus, two 2 cm×2 cm solid images (images 1) each with a recording duty of first ink of 75% were recorded on 2 sheets of recording medium (trade name "Canon Photo Paper Glossy [Gold]" from Canon Inc.). Further, an image (image 2) was recorded by applying a second ink over one of the images 1 so that the recording duty was 100%. In Examples 24 and 25, the first ink and the second ink were replaced with each other, and images were recorded in a similar manner. In addition, in Comparative Examples 3 to 7, images were recorded with the first ink only. In the present invention, in the evaluation criteria for the items below, "AA", "A" and "B" were considered to represent acceptable levels, and "C" was considered to represent an unacceptable level. Evaluation results are summarized in Table 5.

(Fluorescence Intensity)

The recorded images were left for one day, and then the maximum reflected light intensity of each of the image 1 (the other of the images 1 to which the ink had not been applied) and the image 2 was measured with the use of a M1 light source of a spectrometric colorimeter (trade name "eXact", from X-Rite Inc.). Further, the "rate (%) of increase in reflected light intensity of image 2" was calculated from the formula (D) below, and the fluorescence intensity of the image was evaluated according to the evaluation criteria below.

"Rate (%) of increase in reflected light intensity of image 2"=$\{(R_2/R_1)-1\} \times 100$     (D)

$R_1$: Maximum reflected light intensity of image 1
$R_2$: Maximum reflected light intensity of image 2
AA: The rate of increase in the reflected light intensity of image 2 is 2.0% or more, and the maximum reflected light intensity of image 2 is 1.30 or more.
A: The rate of increase in the reflected light intensity of image 2 is 2.0% or more, and the maximum reflected light intensity of image 2 is less than 1.30.
B: The rate of increase in the reflected light intensity of image 2 is 1.0% or more to less than 2.0%.
C: The rate of increase in the reflected light intensity of image 2 is less than 1.0%.

TABLE 5

Constitution of ink set and evaluation results

| | | First ink | Second ink | Content $C_S$ of First Water-Soluble Organic Solvent (%) | SP value $S_S$ of first water-soluble organic solvent $(cal/cm^3)^{1/2}$ | $\|S_S - S_D\|$ $(cal/cm^3)^{1/2}$ | $\|S_S - S_R\|$ $(cal/cm^3)^{1/2}$ | Value of $C_{R2}/C_{R1}$ (times) | Value of $D_2/D_1$ (times) | Value of $C_S/C_{R1}$ (times) | Evaluation results Fluorescence intensity |
|---|---|---|---|---|---|---|---|---|---|---|---|
| Example | 1 | I-1 | II-1 | 10.0 | 11.8 | 1.9 | 1.7 | 0.3 | 1.1 | 1.4 | AA |
| | 2 | I-2 | II-2 | 20.0 | 11.9 | 0.6 | 1.8 | 0.3 | 1.1 | 2.9 | AA |
| | 3 | I-3 | II-1 | 10.0 | 11.8 | 0.2 | 1.7 | 0.3 | 1.1 | 1.4 | AA |
| | 4 | I-4 | II-1 | 10.0 | 11.8 | 0.5 | 1.8 | 0.3 | 0.8 | 1.4 | AA |
| | 5 | I-5 | II-1 | 10.0 | 11.8 | 1.8 | 1.8 | 0.3 | 0.9 | 1.4 | AA |
| | 6 | I-1 | II-3 | 10.0 | 10.1 | 0.2 | 0.0 | 0.3 | 1.1 | 1.4 | AA |
| | 7 | I-1 | II-4 | 10.0 | 11.8 | 1.9 | 1.7 | 0.3 | 1.1 | 1.4 | AA |
| | 8 | I-1 | II-5 | 10.0 | 13.6 | 3.7 | 3.5 | 0.3 | 1.1 | 1.4 | A |
| | 9 | I-1 | II-6 | 10.0 | 13.9 | 4.0 | 3.8 | 0.3 | 1.1 | 1.4 | A |
| | 10 | I-6 | II-1 | 10.0 | 11.8 | 1.9 | — | — | — | — | A |
| | 11 | I-7 | II-1 | 10.0 | 11.8 | 0.2 | — | — | — | — | A |
| | 12 | I-1 | II-7 | 10.0 | 12.0 | 2.1 | 1.9 | 0.3 | 1.1 | 1.4 | AA |
| | 13 | I-1 | II-8 | 10.0 | 12.6 | 2.7 | 2.5 | 0.3 | 1.1 | 1.4 | A |
| | 14 | I-1 | II-9 | 10.0 | 11.8 | 1.9 | 1.7 | 0.0 | 1.1 | 1.4 | A |
| | 15 | I-1 | II-10 | 10.0 | 11.8 | 1.9 | 1.7 | 0.3 | — | 1.4 | B |
| | 16 | I-1 | II-11 | 10.0 | 11.8 | 1.9 | 1.7 | 0.09 | 1.1 | 1.4 | A |
| | 17 | I-1 | II-12 | 10.0 | 11.8 | 1.9 | 1.7 | 0.10 | 1.1 | 1.4 | AA |
| | 18 | I-1 | II-13 | 10.0 | 11.8 | 1.9 | 1.7 | 0.3 | 0.2 | 1.4 | A |
| | 19 | I-1 | II-14 | 10.0 | 11.8 | 1.9 | 1.7 | 0.3 | 0.3 | 1.4 | AA |
| | 20 | I-1 | II-15 | 10.0 | 11.8 | 1.9 | 1.7 | 0.3 | 2.0 | 1.4 | AA |
| | 21 | I-1 | II-16 | 10.0 | 11.8 | 1.9 | 1.7 | 0.3 | 2.1 | 1.4 | A |
| | 22 | I-1 | II-17 | 6.0 | 11.8 | 1.9 | 1.7 | 0.3 | 1.1 | 0.9 | A |
| | 23 | I-1 | II-18 | 7.0 | 11.8 | 1.9 | 1.7 | 0.3 | 1.1 | 1.0 | AA |
| | 24 | I-1 | II-1 | 10.0 | 11.8 | 1.9 | 1.7 | 0.3 | 1.1 | 1.4 | A |
| | 25 | I-6 | II-19 | 10.0 | 12.6 | 2.7 | — | — | — | — | B |
| Comparative Example | 1 | I-1 | II-20 | 0.0 | 16.4 | 6.5 | 6.3 | 0.3 | 1.1 | 0.0 | C |
| | 2 | I-6 | II-20 | 0.0 | 16.4 | 6.5 | — | — | — | — | C |
| | 3 | I-1 | | — | — | — | — | — | — | — | C |
| | 4 | I-6 | | — | — | — | — | — | — | — | C |
| | 5 | I-8 | | — | — | — | — | — | — | — | C |
| | 6 | I-9 | | — | — | — | — | — | — | — | C |
| | 7 | I-10 | | — | — | — | — | — | — | — | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ink jet recording method, comprising:
    using an ink set being composed of a plurality of aqueous inks and including a combination of a first ink containing a coloring material and a second ink containing no coloring material; and
    recording an image by applying the first ink and the second ink onto a recording medium, so that an area to which the first ink is applied and an area to which the second ink is applied overlap at least in part with each other,
    wherein the coloring material of the first ink comprises a fluorescent dye,
    wherein the second ink comprises a first water-soluble organic solvent, and
    wherein a SP value $S_S$ of the first water-soluble organic solvent and an SP value $S_D$ of the fluorescent dye satisfy a relationship of the following formula (1):

$$|S_S - S_D| \leq 4.0 \quad (1).$$

2. The inkjet recording method according to claim 1, wherein the first ink comprises a first resin particle dyed with the fluorescent dye, and
wherein an SP value $S_R$ of a resin forming the first resin particle and an SP value $S_S$ of the first water-soluble organic solvent satisfy a relationship of the following formula (2):

$$|S_S - S_R| \leq 3.5 \quad (2).$$

3. The ink jet recording method according to claim 2, wherein an SP value $S_R$ of a resin forming the first resin particle and an SP value $S_S$ of the first water-soluble organic solvent satisfy a relationship of the following formula (3):

$$|S_S - S_R| \leq 2.0 \quad (3).$$

4. The inkjet recording method according to claim 2, wherein the second ink further comprises a water-soluble resin.

5. The inkjet recording method according to claim 2, wherein the second ink further comprises a second resin particle.

6. The ink jet recording method according to claim 4, wherein a content (% by mass) of the water-soluble resin in the second ink, when expressed in mass ratio relative to a content (% by mass) of the first resin particle in the first ink, is 0.1 times or more.

7. The inkjet recording method according to claim 5, wherein a cumulative 50% particle diameter in volume-based particle size of the second resin particle, when expressed in a ratio relative to a cumulative 50% particle diameter in volume-based particle size of the first resin particle, is 0.3 times or more to 2.0 times or less.

8. The inkjet recording method according to claim 2, wherein a content (% by mass) of the first water-soluble organic solvent in the second ink, when expressed in mass ratio relative to a content (% by mass) of the first resin particle in the first ink, is 1.0 times or more.

9. The ink jet recording method according to claim 1, comprising:
a first recording step of applying the first ink onto the recording medium; and
a second recording step of applying the second ink onto the recording medium so that an area to which the second ink is applied overlaps at least in part with an area to which the first ink is applied.

10. An ink jet recording apparatus used for the ink jet recording method according to claim 1, comprising:
a recording head that uses an ink set composed of a plurality of aqueous inks and including a combination of a first ink containing a coloring material and a second ink containing no coloring material, and records an image by applying the first ink and the second ink onto a recording medium so that an area to which the first ink is applied and an area to which the second ink is applied overlap at least in part with each other,
wherein the coloring material of the first ink comprises a fluorescent dye,
wherein the second ink comprises a first water-soluble organic solvent, and
wherein an SP value $S_S$ of the first water-soluble organic solvent and an SP value $S_D$ of the fluorescent dye satisfy a relationship of the following formula (1):

$$|S_S - S_D| \leq 4.0 \tag{1}.$$

11. The ink jet recording method according to claim 1, wherein the SP value $S_D$ of the fluorescent dye is 5.0 or more to 20.0 or less.

12. The ink jet recording method according to claim 1, wherein the fluorescent dye is selected from the group consisting of C.I. Basic Red 1, C.I. Basic Red 1:1, C.I. Basic Violet 11, C.I. Basic Violet 11:1, C.I. Basic Yellow 40, C.I. Solvent Yellow 160:1, C.I. Solvent Yellow 196, C.I. Disperse yellow 82, and C.I. Fluorescent Brightener 351.

13. The ink jet recording method according to claim 2, wherein the SP value $S_R$ of the resin forming the first resin particle is 5.0 or more to 20.0 or less.

14. The ink jet recording method according to claim 2, wherein the first resin particle has a core portion and a shell portion which covers the core portion.

15. The ink jet recording method according to claim 14, wherein a resin forming the core portion of the first resin particle comprises an aromatic group-containing unit and a cyano group-containing unit, and a resin forming the shell portion of the first resin particle comprises an aromatic group-containing unit, an anionic group-containing unit, and a crosslinking agent-derived unit.

16. The ink jet recording method according to claim 2, wherein a percentage (% by mass) of the fluorescent dye in the first resin particle is 1.0% by mass or more to 15.0% by mass or less.

17. The ink jet recording method according to claim 1, wherein the SP value $S_S$ of the first water-soluble organic solvent is 10.0 or more to 20.0 or less.

18. The ink jet recording method according to claim 5, wherein the second resin particle has a core-shell structure.

19. The ink jet recording method according to claim 1, wherein the content (% by mass) of the fluorescent dye in the first ink is 0.1% by mass or more to 5.0% by mass or less based on the total mass of the first ink.

20. The ink jet recording method according to claim 1, wherein the content (% by mass) of the first water-soluble organic solvent in the second ink is 1.0% by mass or more to 25.0% by mass or less based on the total mass of the second ink.

21. The ink jet recording method according to claim 4, wherein the content of the water-soluble resin in the second ink is 0.1% by mass or more to 5.0% by mass or less based on the total mass of the second ink.

22. The ink jet recording method according to claim 5, wherein the content (% by mass) of the second resin particle in the second ink is 0.10% by mass or more to 5.0% by mass or less based on the total mass of the second ink.

23. The ink jet recording method according to claim 1, wherein the first ink is applied onto the recording medium prior to the second ink.

* * * * *